Dec. 9, 1952      C. J. CIANCIO      2,620,716

TRACTOR HITCH FOR FARM MACHINERY

Filed June 30, 1950

Inventor
CHARLES J. CIANCIO

By Anderson & Mueller

Attorneys

Patented Dec. 9, 1952

2,620,716

UNITED STATES PATENT OFFICE 2,620,716

TRACTOR HITCH FOR FARM MACHINERY

Charles J. Ciancio, Denver, Colo.

Application June 30, 1950, Serial No. 171,506

3 Claims. (Cl. 97—50)

This invention relates to improvements in power pickup hitches for tractors, and has reference more particularly to a power pickup for use in connection with land levelers and other apparatus of extended area.

Practically all farm tractors manufactured and sold today are provided with power operated mechanisms by means of which the tools may be raised and lowered during operation, and which therefore reduce the effort necessary for operating such tractor-drawn tools.

In many sections of our country it is the practice to level the land so as to remove any small irregularities, and for this purpose tools known as "land levelers" have been extensively employed. The ordinary land leveler is a large tool comprising a rectangular frame that slides on the top of the ground surface and which is provided with a central scraper blade that serves to plane off the tops of elevations and deposits the same in adjacent depressions. Some of the larger land levelers are of great length and comprise a frame supported at each end on wheels, the frame being provided at its center with a scraper blade.

The mechanism to which this invention relates is a land leveler of somewhat small area that is suitable for garden tracts and fields of ordinary size.

When leveling fields with a leveler of ordinary construction having a central scraper blade, as drawn over the ground by an ordinary tractor, it must be connected with the tractor by a flexible connection so that the leveler may follow the irregularities of the ground surface. Such flexible connections can be easily effected, but when land levelers are connected with tractors by such means, great difficulty is experienced in turning corners of 90 degrees, or at the end of the field where 180 degree turns must be made.

It is the object of this invention to produce a modified tractor hitch by means of which a land leveler or a similar tool of extended area can be bodily raised from the ground so as to facilitate making turns or backing.

It is another object of this invention to produce a power lift for land levelers and similar devices which shall require a minimum modification of the tool lifting devices with which the tractors are provided.

Another object of this invention is to produce a power operated lifting device that, in addition to raising the tool from the ground, shall also, at least to some extent, serve as means for holding it in contact with the ground surface.

The above and other objects that may become apparent as this description proceeds are attained by means of a construction and an arrangement of parts that will now be described in detail, for which purpose reference will now be had to the accompanying drawing in which the invention has been illustrated in its preferred form, and in which.

Figure 1:
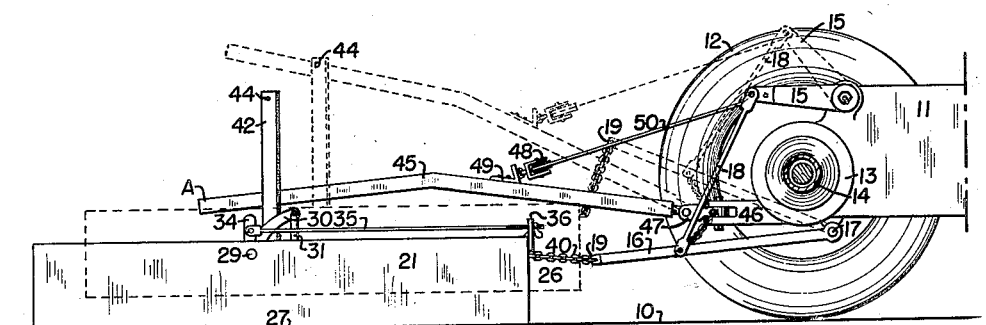
Figure 1 is a view showing the land leveler in side elevation, and showing a portion of the tractor in section and other portions thereof in elevation, the view being taken on line 1—1, Figure 2.

In the drawing, reference numeral 10 designates the surface of the soil and reference numeral 11 designates the body of the tractor whose rear drive wheels have been designated by reference numeral 12. The differential housing has been designated by reference numeral 13, and the axle housing by reference numeral 14.

Since the tractor is a well-known construction and is exemplified by the Ford tractor, the operation of the power lifting device as far as the elements forming part of the tractor are involved will not be described with any greater particularity than necessary to describe the operation of the mechanism that forms the subject of this invention.

The tractor which is illustrated is provided with lifting arms 15 that are controlled by a hydraulic mechanism located within the tractor body. These lifting arms can be moved angularly and their movement controlled by a suitable valve, all in a manner well-known. In addition to the lifting arms the tractor is provided with two tractor links 16 that are pivoted at 17. The ends of the lifting arms are connected with the tension links by means of bars 18. The tension links extend rearwardly to a greater extent than lifting arms 15 and have been shown as terminating at point 19. It is now evident that when power is applied to the lifting arms to move them in a clockwise direction as shown in Figure 1, they will impart a corresponding movement to the tension arms with which they are connected.

Figure 2:
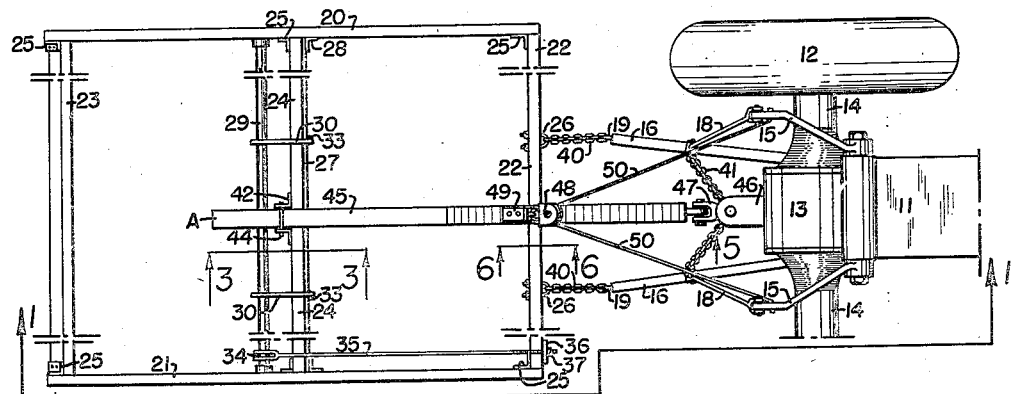
Figure 2 is a top plan view looking downwardly in Figure 1.

For purpose of illustration, a land leveler of simple construction has been shown as connected with the tractor in an operative manner. The present embodiment of the land leveler comprises a rectangular frame made from 2 x 8 planks and has parallel side members 20 and 21 that are connected adjacent their ends by similar planks 22 and 23. A popular size for land levelers for small farms and the garden tracts is 8 ft. x 8 ft. Extending across the rectangular frame near the middle thereof is a plank 24 of the same size as the side and end planks. The transverse planks are easily held in place by means of angle irons 25. U-bolts 26 are secured to the front plank as shown in Figures 1 and 2.

The central plank, which has been designated by reference numeral 24, is provided with a steel blade 27 that is vertically adjustable and whose ends slide in the channel between the front surface of plank 24 and the angle irons 28. For the purpose of adjusting the position of scraper blade 27, a shaft 29 has its ends pivotally connected with the side members 20 and 21 so as to be rotatable through a small angle. Shaft 29 is provided with two crank arms 30 that project over and to the front side of plank 24. Rigid connecting rods 31 extend from the free ends of crank arms 30 to the pivot point 32 in lug 33 which is provided for this purpose on the front side of the scraper blade. One end of shaft 19 is provided with a crank arm 34 from which a rod 35 extends forwardly and passes through an opening in bracket 36. The front end of rod 35 is threaded and provided with a nut 37 that is preferably provided with a handle 38 by means of which it may be rotated. It is evident that if nut 38 is rotated so as to shorten the distance between crank arm 34 and bracket 36, shaft 39 will turn in a clockwise direction and move the scraper blade downwardly, and likewise if the nut is turned in the opposite direction the scrape blade will move upwardly. By this simple adjustment the speed at which the leveling action takes place can be conveniently regulated. Short links of chain 40 connect the U-bolts 26 with the adjacent ends of the tension links 16, as shown most clearly in Figures 1 and 2. When the land leveler is pulled over the field by means of a tractor to which it is attached as shown, it is free to conform to a considerable extent with the irregularities of the surface. The flexible chain connections 40 permit the land leveler to move slightly in several directions. Experience has shown that a land leveler cannot be satisfactorily operated if rigid connections are provided between it and the tractor. Short sections of chain 41 connect the tension links with the differential housing for the purpose of limiting lateral movement of the tension links, which is of considerable importance when going around curves as sometimes becomes necessary due to the contour of the land where the machine is operated.

With the parts as far as they have been described, it is evident that if the lifting arms 15 are rotated in a clockwise direction they will lift the tension links, but although they may lift the front end of the land leveler, they cannot raise the rear end thereof. In order to overcome the difficulty just mentioned and to effect a lifting of the entire land leveler, the modifications which will now be described have been made.

Figure 3:
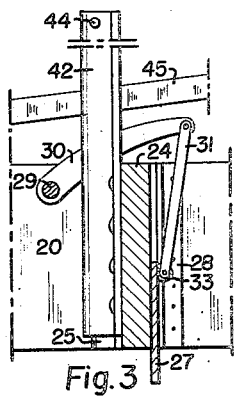
Figure 3 is a section taken on line 3—3, Figure 2.
Figure 4:
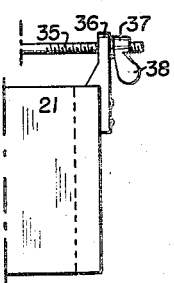
Figure 4 is a fragmentary side elevation taken on line 4—4, Figure 2.
Figures 5, 6:
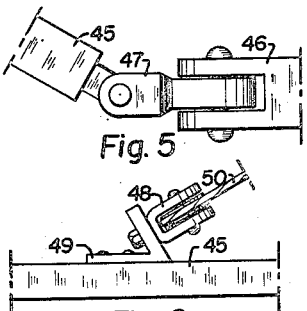
Figure 5 is a fragmentary side elevation looking in the direction of arrow 5 in Figure 2, showing one form of universal connection that may be employed at this point.
Figure 6 is a section taken on line 6—6, Figure 2.

Extending upwardly from the middle point of plank 24 are two spaced angle irons 42 that are connected with member 24 by means of bolts or screws such as those designated by 43 in Figure 3. A bolt 44 connects the upper ends of angle irons 42. A bar 45 which may be of channel-shaped cross section has its front end connected with a traction lug 46 by a universal joint 47, as shown most clearly in Figure 5. Bar 45 has been shown as formed by two angularly related sections, the one nearer the free end thereof having been designated by letter "A," and this extends between the guide angles 42. A pulley 48 is attached to bar 45 by means of a bracket 49. A wire cable 50 has its ends connected to the outer ends of the lifting arms, and passes about pulley 48, which is thus positioned in the bight of this cable. It will be evident from Figure 2 that the land leveler frame may move laterally to a limited extent without subjecting cables 50 to any considerable strain, because pulley 48 will roll along the cable to accommodate its position to the angular relation of the parts.

Figure 7:
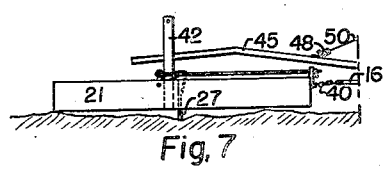
Figure 7 is a fragmentary side elevation to a reduced scale intended for explanatory purposes.

Let us now assume that the parts are constructed in the manner shown on the drawing and above described. When the parts are in the position shown by full lines in Figure 1, the land leveler is free to rest on the surface of the ground and to effect a leveling or planing action by means of blade 27. This is shown with greater clarity in Figure 7 where the irregularities of the soil have been exaggerated. When it is necessary to raise the land leveler for the purpose of effecting a right angular or 180 degree turn or for the purpose of backing the machine, the lifting arms 15 are actuated by the hydraulic mechanism that forms part of the tractor and move upwardly to the position indicated by broken lines. This in turn causes a corresponding angular movement of the tension arms, bringing the point 19 upwardly to the position indicated by the broken lines. Since the cables are connected with the ends of the lifting arms they will also move, and since they are connected with the bar 45 by means of the pulley, this bar will move upwardly to the broken line position shown in Figure 1. Before reaching this position it will engage bolt 44 and lift the rear end of the land leveler. Attention is called at this point to the fact that as the front ends of the tension links move upwardly chains 40 will effect lifting of the front end of the leveler so that when the parts have reached the position shown by dotted lines in Figure 1 the land leveler will be held a short distance above the ground surface, thereby permitting the operator to turn corners of any angularity and/or to back the assembly so as to bring the leveler to the outer margin of the field that is under treatment.

The parts are usually so adjusted that during operation there is no tension in cables 50, and bar 45 therefore rests on the top of plank 34, adding its weight to the weight of the leveler, thereby serving to hold the latter in firmer engagement with the ground.

Having described the invention, what I claim as new is:

1. A power propelled ground working implement comprising a wheeled tractor having a rear axle and its rear end provided with two lifting arms having their front end mounted for pivotal angular movement about a common transverse axis positioned above and to the front of the rear axle, a tension link positioned below the rear axle and below each lifting arm and mounted for pivotation about a common axis, tension members connecting the lifting arms with the correspondingly positioned tension links, a ground working tool of extended area positioned to the rear of the tractor, flexible means attaching the free rear end of each tension link with the front end of the ground working tool, whereby the latter will be free to adjust itself to the surface of the ground when drawn over it by the tractor and whereby the front end of said ground working tool can be raised only when the tension links are raised beyond a predetermined point, means comprising a tension element connected with the movable ends of the lifting arms and having a lost motion connection with the ground working tool at a point above and to the rear of its center of mass for raising the rear end of the ground working tool when the lifting arms are moved to raise the tension links and the front end of the tool, and a bar having its front end pivotally connected with the tractor and its rear end connected with the ground working tool by means having a lost motion permitting a limited vertical movement between the bar and the ground working tool, the point of said last mentioned connection being above and to the rear of the center of mass of the ground working tool, and in which the tension members that are connected with the lifting arms are connected with the bar between its point of pivotation and the lost motion connection, whereby the bar will raise and lift the rear end of the ground working tool when the lifting arms are moved upwardly.

2. In a ground working implement having a tractor provided adjacent its rear end with hydraulically operated lifting arms pivoted to the tractor at a point above and to the front of the rear axle, and a pair of tension links pivoted to the tractor at a point below the rear axle and in which the free ends of the lifting arms are connected with the tension links by tension members, whereby the rear ends of the tension links will be raised when the free ends of the lifting arms are raised, a ground working tool of extended area positioned to the rear of the tractor, means connecting the front end of the tool with the rear ends of the tension links in a manner whereby when the rear ends of the tension links are moved upwardly in response to a predetermined upward movement of the free ends of the lifting arms the front end of the tool will be raised from the ground, and means for raising the rear end of the tool, comprising, a bar having its front end connected with the rear end of the tractor for pivotal movement, said bar extending rearwardly over the tool to a point at the rear of the center of mass thereof, means comprising a tension device having one end connected with the tool to the rear of the center of mass thereof, the parts being so arranged that there is a lost motion connection between the tool and the bar, and means for raising the rear end of the bar when the front end of the tool is raised by the tension links, said last mentioned means comprising tension elements connecting the rear ends of the lifting arms with the bar at a point to the rear of its pivot point.

3. A device in accordance with claim 2 in which the connection between the rear ends of the tension links and the front end of the tool is formed in part by flexible tension members.

CHARLES J. CIANCIO.

REFERENCES CITED

The following references are of record in the file of this patent:

UNITED STATES PATENTS

| Number | Name | Date |
|---|---|---|
| 1,207,430 | Nilson | Dec. 5, 1916 |
| 1,624,421 | Meyer | Apr. 12, 1927 |
| 2,273,875 | Livesey et al. | Feb. 24, 1942 |
| 2,364,121 | Arps | Dec. 5, 1944 |
| 2,389,199 | Laird | Nov. 20, 1945 |
| 2,440,550 | Martin | Apr. 27, 1948 |
| 2,543,943 | Skeem | Mar. 6, 1951 |
| 2,591,028 | Udy | Apr. 1, 1952 |